(No Model.)
R. VOLLSCHWITZ
ANIMAL TRAP.
No. 393,087. Patented Nov. 20, 1888.
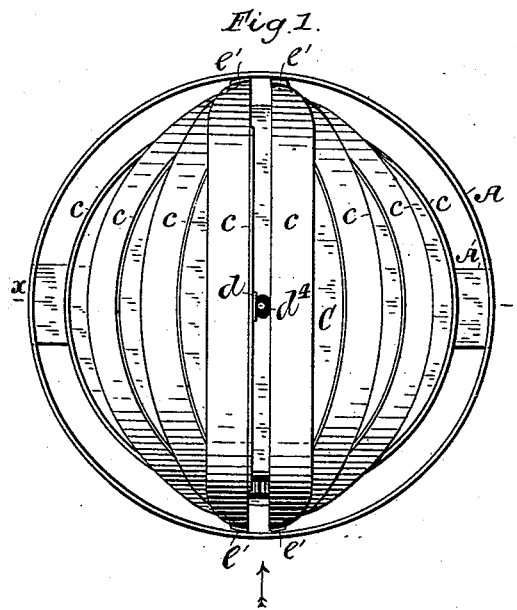
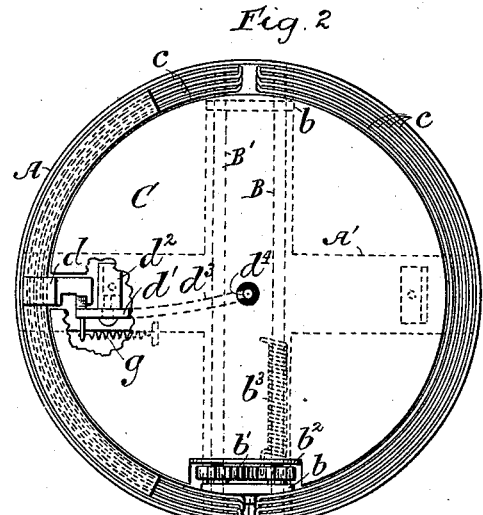
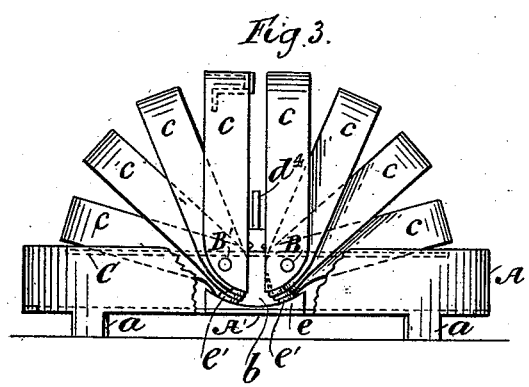
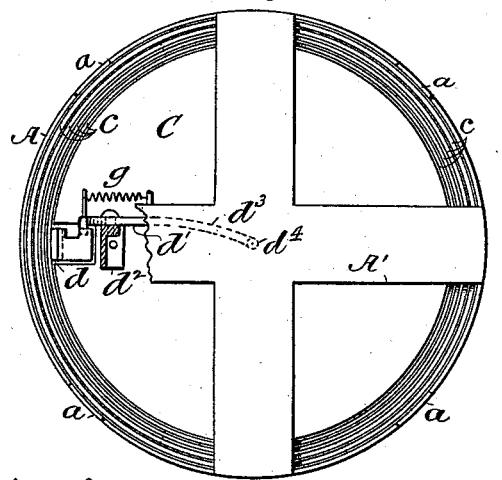
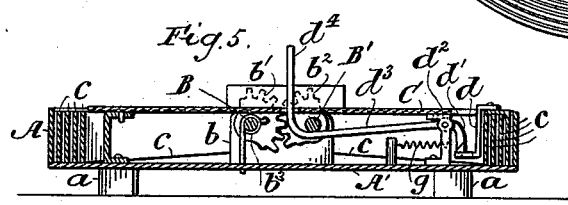
Witnesses,
Fred Kemper,
Maurice J. Roach.
Inventor,
Rudolph Vollschwitz,
By his attorneys
Gifford Brown.
N. PETERS, Photo-Lithographer, Washington, D. C.

UNITED STATES PATENT OFFICE.

RUDOLPH VOLLSCHWITZ, OF HOBOKEN, NEW JERSEY.

ANIMAL-TRAP.

SPECIFICATION forming part of Letters Patent No. 393,087, dated November 20, 1888.

Application filed March 16, 1888. Serial No. 267,348. (No model.)

*To all whom it may concern:*

Be it known that I, RUDOLPH VOLLSCHWITZ, of Hoboken, in the county of Hudson and State of New Jersey, have invented a new and useful Improvement in Animal-Traps, of which the following is a specification.

I will describe an animal-trap embodying my improvement in detail, and then point out the novel features in claims.

In the accompanying drawings, Figure 1 is a plan or top view of a trap embodying my improvement, the same being shown closed. Fig. 2 is a similar view showing the trap open. Fig. 3 is a side view of the trap and looking in the direction of the arrow, Fig. 1. Fig. 4 is a bottom plan view of the same, certain parts being broken away and shown in dotted outline to conduce to clearness. Fig. 5 is a section of the open trap, taken on the plane of the line $x\ x$, Fig. 1, and looking in the direction of the arrow, Fig. 1.

Similar letters of reference designate corresponding parts in all the figures.

A designates the frame of the trap, here shown as a strip of metal bent into circular form. Secured to the frame are legs $a$, by which the trap is supported. The ends of the strip composing the frame are joined to one of the arms of a spider, A', extending across the bottom of the trap. The other arms of the spider are also secured to the frame.

Secured upon the spider, upon opposite arms thereof, are bearings $b$, in which are journaled shafts B B'. These shafts are adapted to rotate in unison, being provided with intermeshing gear-segments $b'\ b^2$ for this purpose. They are so caused to rotate by means of a spring, $b^3$, (shown as a coil-spring,) coiled about the shaft B, and secured at one end to said shaft and at the other end to the spider A'. Instead of using the shaft B', the gear-segments $b^2$ may be mounted upon studs.

C designates the floor or bottom of the trap, and $c$ bars which, when the trap is closed, form the sides or covering for the trap. I have shown eight of such bars made of strips of metal; but I may use any desired number and they may be of other shape than flat. Four of the bars are adapted to be shut down upon one side of the trap within the frame, and the other four upon the other side of the trap within the frame, all the bars being then approximately flush with the floor of the trap. The four bars upon one side are secured near their ends to the ends of the shaft B, and the other four are similarly secured to the shaft B'. When the shafts B B' are rotated by means of the spring $b^3$, the arms upon both sides are thrown up so that they will occupy the position shown in Figs. 1 and 3. When the trap is to be set, the bars are swung down into the position shown in Figs. 2 and 5. A catch, $d$, on the upper of the bars $c$ upon one side then engages a detent or retaining-piece, $d'$. This detent is loosely pivoted upon a pin or projection extending from an upright, $d^2$, secured to the spider A'. Extending from the detent is a bent arm, $d^3$, a portion, $d^4$, of which extends upwardly through a central aperture in the floor or bottom of the trap. Bait is to be placed upon said portion $d^4$. When the portion $d^4$ of said arm is moved after the trap has been set, the detent is moved away from the catch $d$, and the bars $c$ will be sprung rapidly into position by the spring $b^3$, so as to inclose an animal attacking the bait. A spring, $g$, secured at one end to the detent $d'$ and at the other to the spider, tends to return the detent to a position to again engage the catch $d$ after the detent has been released.

Upon one of the bearings $b$ is a stop, $e$, shown as having a curved surface. The lower of the bars $c$ are provided with outwardly turned or projecting portions $e'$, which when the bars are in a position to close the trap contact with curved surface on the stop $e$ and prevent the too extended upward movement of said lower bars. All the other bars except the upper are also shown as provided with outwardly turned or projecting portions $e'$, constituting stops which contact with each other when the trap is closed to prevent a too extended movement upwardly of such bars. The upper bars $c$ contact at their ends with the outwardly turned or projecting portions $e'$ on the next adjacent bars. These projections also prevent the separation of the bars other than the two upper bars when the trap is closed.

What I claim as my invention, and desire to secure by Letters Patent, is—

1. In an animal-trap, the combination, with a bottom or floor, of two sets of bars adapted to be swung downwardly in unison upon opposite sides of the trap approximately flush with the bottom or floor, a catch for securing said bars in such position, a detent, and a projection extending through and above the bottom or floor to release the detent, substantially as specified.

2. In an animal-trap, the combination, with a bottom or floor, of two sets of bars, shafts to which the sets of bars are secured at their ends, said bars being geared together, a spring for rotating said shafts in one direction, a catch for securing the bars when the trap is open, and a detent operated from a projection extending above the bottom or floor to release the catch, substantially as specified.

3. In an animal-trap, the combination, with a bottom or floor, of two sets of bars adapted to be swung downwardly in unison upon opposite sides of the trap and upwardly in unison to close the trap, shafts upon which said bars are mounted, and stops at the ends of the bars adjacent to the shafts adapted to contact with each other to prevent a too extended upward movement of the bars, substantially as specified.

RUDOLPH VOLLSCHWITZ.

Witnesses:
JAMES S. GREVES,
MAURICE J. ROACH.